United States Patent
Bennett (10) Patent No.: US 10,299,619 B1
(45) Date of Patent: May 28, 2019

(54) EVENT DRAPERY UPRIGHT AND BASE PLATE SUPPORTS

(71) Applicant: David A. Bennett, Henderson, NV (US)

(72) Inventor: David A. Bennett, Henderson, NV (US)

( * ) Notice: Subject to any disclaimer, the term of this patent is extended or adjusted under 35 U.S.C. 154(b) by 0 days.

(21) Appl. No.: 15/920,420

(22) Filed: Mar. 13, 2018

Related U.S. Application Data (60) Provisional application No. 62/471,221, filed on Mar. 14, 2017.

(51) Int. Cl.
*A47H 1/02* (2006.01)
*F16M 11/38* (2006.01)

(52) U.S. Cl.
CPC ............... *A47H 1/02* (2013.01); *F16M 11/38* (2013.01)

(58) Field of Classification Search
CPC .. A47H 1/02; F16M 11/38; A63J 1/02; H01Q 1/12; H01Q 1/1235; E04C 2003/026
See application file for complete search history.

(56) References Cited

U.S. PATENT DOCUMENTS

| | | | |
|---|---|---|---|
| 2,799,369 A * | 7/1957 | Walton | E04H 17/08 52/151 |
| 3,153,527 A | 10/1964 | Giglioli | |
| 4,083,156 A | 4/1978 | Tye | |
| 4,908,999 A * | 3/1990 | Harris | E04H 3/126 182/223 |
| 5,556,065 A * | 9/1996 | Wadley | A61M 5/1415 248/129 |
| 5,890,687 A * | 4/1999 | Pryor | A61M 5/1415 248/125.8 |
| 5,927,514 A | 7/1999 | Linder | |
| 6,411,778 B1 | 6/2002 | Peterson | |
| 6,720,490 B1 | 4/2004 | Bruce | |
| 7,093,824 B2 | 8/2006 | Pulliam | |
| 7,514,619 B1 | 4/2009 | Bruce | |
| 7,802,764 B2 * | 9/2010 | Leinen | A61M 5/1415 248/129 |
| 8,905,249 B2 | 12/2014 | Whitacre | |
| 9,390,639 B2 | 7/2016 | Pelletier | |
| 9,487,967 B2 * | 11/2016 | Anson | E04H 17/10 |
| 2003/0015633 A1 | 1/2003 | Pyanowski et al. | |
| 2008/0001052 A1 | 1/2008 | Kalous et al. | |

(Continued)

OTHER PUBLICATIONS

Stage Weights, Braces & Sand Bags; retrieved on Apr. 12, 2017, from: www.stage-electrics.co.uk/shop/sales/scenic-materials/scenery-flatage-and-fittings/stage-weights-braces-and-sand-bags.

(Continued)

*Primary Examiner* — Ko H Chan (74) *Attorney, Agent, or Firm* — Kenehan & Lambertsen, Ltd.; John C. Lambertsen (57) ABSTRACT

Uprights and base plates provide adjustable, temporary support for drapery used to define event and theater space. An upright tube and a connected angled back support offer stabilized support to drapery lines. The upright tube extends from a support plate within a framed base plate. A hinge connector in the base plate attaches to the angled back support, which extends to a clamped connection with the upright tube. Alternative arrangements of the support plates and hinge connectors within the base plate offer multiple drapery support configurations.

12 Claims, 5 Drawing Sheets

(56) References Cited

U.S. PATENT DOCUMENTS

2008/0006746 A1  1/2008  Volochine
2011/0173918 A1  7/2011  Graham

OTHER PUBLICATIONS

Qualcraft 2620 Adjustable Wall Brace; retrieved on Apr. 12, 2017, from: www.amazon.com/Qualcraft-2620-Adjustable-Wall-Brace/dp/B0000VUNUQ.

* cited by examiner

EVENT DRAPERY UPRIGHT AND BASE PLATE SUPPORTS

RELATED APPLICATIONS

The present application claims the benefit of priority under 35 USC § 119(e) to U.S. Provisional Application No. 62/471,221 filed on Mar. 14, 2017, which is incorporated by reference herein for all that it contains.

BACKGROUND OF THE INVENTION

Field of the Invention

The present invention relates to adjustable temporary supports for drapery and, more particularly, to such supports adapted for temporarily mounting drape lines in event space. More specifically, the present invention relates to drape line supports having a base support plate with a hinge-mounted angled back support and a support mount for a vertical upright of fixed or adjustable height.

Description of the Related Art

Theatrical and event space define the physical area in which the stage production and events occur. Such spaces are often designed to be visually plain, avoiding theme limitation. Event planners create themes that often rely on lighting and drapery to transform the space. Lighting and drapery are also used to change the space—by hiding areas, brightening to highlight an area or feature, soften a space, and divide a space into specific-purpose areas.

Installers mount drapes using vertically-adjustable steel pipes set in square base plates (also "framed bases"), typically in sizes of eighteen and twenty-four inches. The upright supports are spaced apart along the planned drape lines. In older event space having lower ceilings, these spaced uprights support a stable suspension of drapery.

As ceiling heights exceed sixteen feet, even weighting the square plates with additional sandbags cannot prevent the drape line from becoming unstable and at risk of collapse. Safety reinforcing wires could stabilize the line, but often there are insufficient hanging points, and event space owners may prohibit installers from creating new attachment locations on adjacent walls and ceilings. A need exists to provide installers with easily-assembled stable supports for mounting drape lines of extended height.

SUMMARY OF THE INVENTION

The present invention utilizes an angled back support pipe or tube, having one end secured to the vertically-adjustable steel upright, and the lower end pinned within a hinged mount formed on the base plate. After top and bottom securement of the angled back support, the uprights receive drapery support crossbars, which attach to and extend across the tops of adjacent uprights. Upon securement of the drapery to the crossbars, and where the upright is height-adjustable, the uprights extend to raise the drape line to the desired height.

An aspect of embodiments in accordance with the present invention is an upright and base plate supports for event drapery, the base plate comprising: an outer frame, wherein the outer frame defines a geometric shape having opposed sides. At least one central support brace attached to and extending between the opposed sides, with an upright support plate attached to a lateral edge of the at least one central support brace and attached to one of the opposed sides of the outer frame, wherein the upright support plate has a central pin attached to an upper surface of the upright support plate and projects therefrom in a manner adapted to receive an upright tube. A hinge connector attached to the outer frame and adapted to receive an angled back support, the hinge connector at a location on the outer frame adapted to cooperatively position and support the angled back support relative to the upright tube when received and extending from the support plate.

Another aspect of embodiments in accordance with the present invention is upright and base plate supports adapted for support event drapery, comprising: a base plate comprising: an outer frame, the outer frame of geometric shape defining a pair of opposing sides, at least one support brace attached to the outer frame and extending between the pair of opposing sides, an upright support plate attached to a side of the outer frame and to a lateral side of the at least one support brace, and a hinge connector attached to a side of the outer frame. An upright tube received by the upright support plate and vertically extending therefrom, wherein an end of the upright tube is adapted to receive and support a drapery line; and an angled back support having a first end and a second end, wherein the first end is attached to the hinge connector and the second end is attached to the upright tube at an elevated location thereon.

It is to be understood that the invention is not limited in its application to the details of construction and the arrangement of components described hereinafter and illustrated in the drawings. Those skilled in the art will recognize that various modifications can be made without departing from the scope of the invention.

These and other objects, aspects, and features of the present invention will be better understood from the following description of embodiments when read in conjunction with the appended drawing figures.

BRIEF DESCRIPTION OF THE DRAWINGS

Embodiments in accordance with the present invention are described below in connection with the accompanying drawing sheets.

DETAILED DESCRIPTION OF THE PREFERRED EMBODIMENTS

The event drapery upright and base plate supports is disclosed herein with respect to exemplary embodiments. The embodiments are disclosed for illustration of the event drapery upright, and base plate supports, and a manner of making use of such upright and base plate supports and are not limiting except as defined in the appended claims.

Drape lines constructed to provide visual separation in event space utilize drape support crossbars mounted upon and extending between adjacent pipe upright supports, with the uprights extending from base plates resting on the event space floor. Often weighted bags rest upon the base plates, providing stability counterweights to the weight of the supported drape line.

Figures 1, 2:
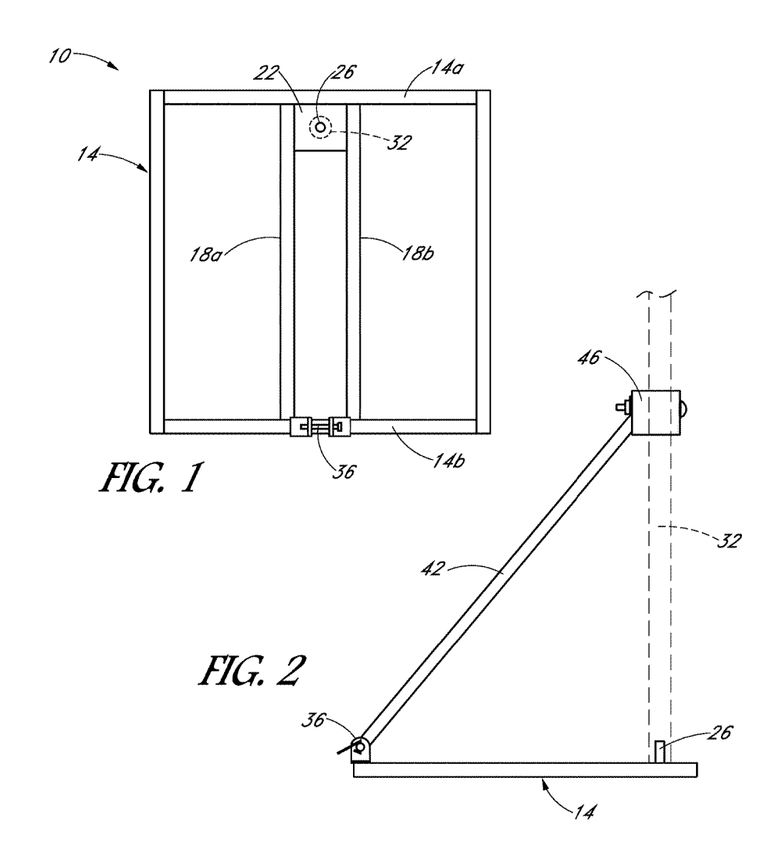
FIG. 1 is a top plan view, with portions in phantom, of a base plate having an upright support mount and an angled back hinge connector located mid-way and on opposite sides of the base plate in accordance with the present invention.
FIG. 2 is a partial side elevation view, with portions in phantom, showing an angled back support attached to the base plate and to an upright support mounted in the base plate in accordance with the present invention.

Reference is now made to the drawings wherein like structures refer to like parts throughout. In FIG. 1, a base plate 10 has an outer frame 14 of standard, rectangular configuration, although other geometric shapes having opposed sides are also contemplated as within the present invention. A pair of central support braces 18a, 18b attach to and extending between opposed sides of the outer frame. An upright support mount or plate 22 lies between and is attached to a lateral edge of each of the pair of support braces 18, and adjacent an outer frame member 14a to which it also is attached. A central pin 26 projects from the support plate and is appropriately dimensioned to slidably receive an end of an upright tube 32, shown in phantom. A hinge mount or connector 36 lies between the central support braces and is attached to an outer frame member 14b opposite the upright support plate.

Figure 3:
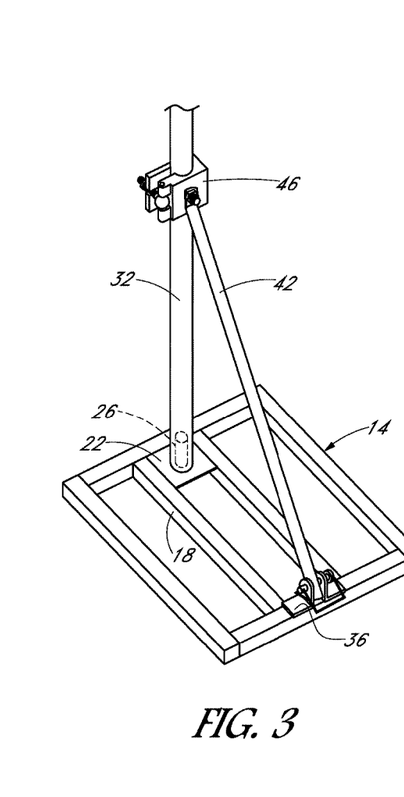
FIG. 3 is a partial perspective view, with portions in phantom, showing an upright support mounted in the base plate with an angled back support attached to both the mounted upright support and to the base plate in accordance with the present invention.

FIGS. 2 and 3 show an angled back support 42 attached to the hinge connector 36 and extending to a securement clamp 46 attached to the upright tube 32 at an elevated location thereon (shown in phantom in FIG. 2). In a presently preferred embodiment, the securement clamp is a swivel clamp, and the hinge mount is an L-Bracket hinge with a locking pin to secure the angled back support within the hinge.

Figures 4, 5:
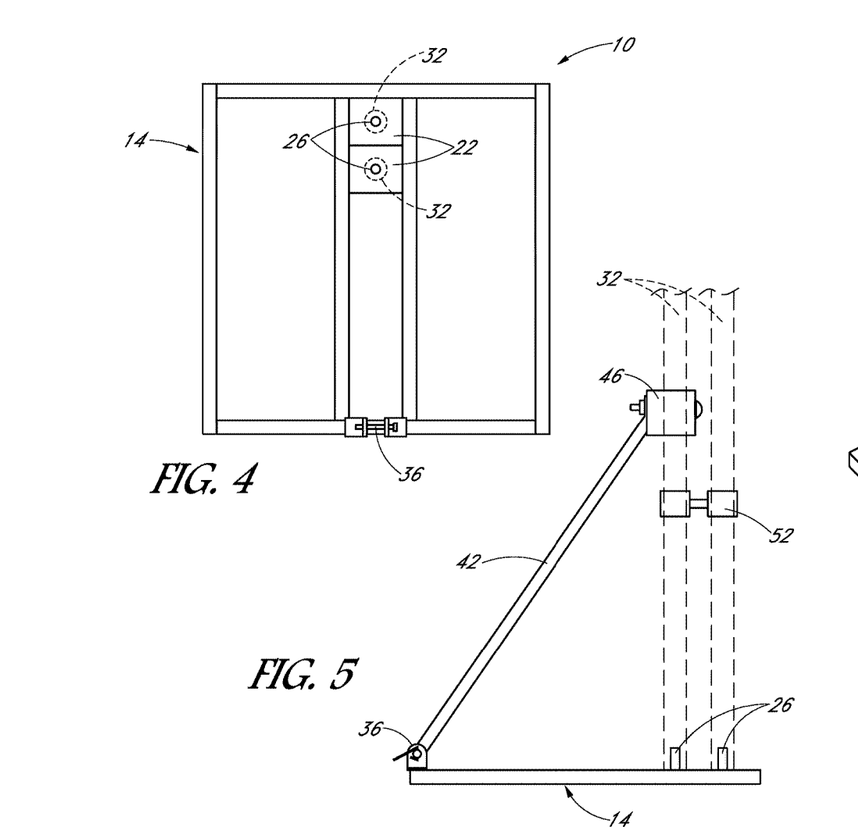
FIG. 4 is a top plan view, with portions in phantom, of a base plate of alternative design with an adjacent pair of upright support mounts opposite the angled back support hinge connector in accordance with the present invention.
FIG. 5 is a partial side elevation view, with portions in phantom, showing an angled back support attached to the base plate and attached to one of an adjacent pair of upright supports in accordance with the present invention.
Figure 6:
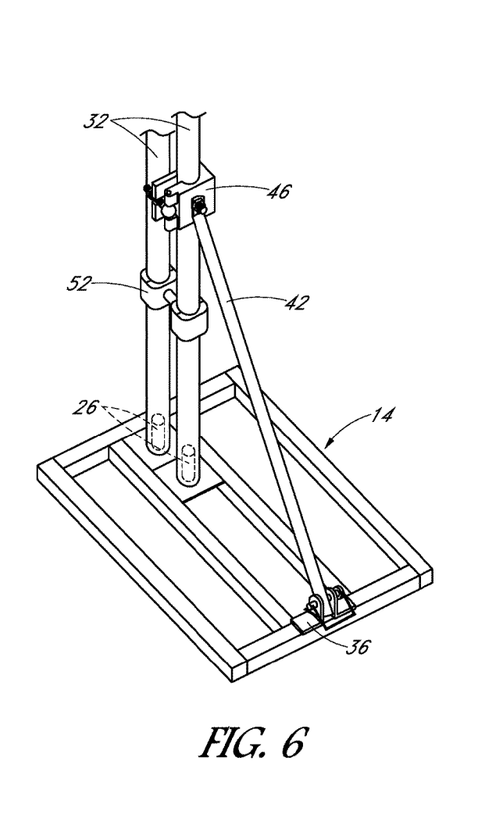
FIG. 6 is a partial perspective view, with portions in phantom, showing an angled back support attached to the base plate and to one of an adjacent pair of upright supports mounted in the base plate in accordance with the present invention.

Event planners occasionally utilize two layers of drapery, requiring two separate upright tubes. FIGS. 4-6 shows a pair of the upright support plates 22 within the base plate 10, each having an upright central pin that are adapted to, in combination, receive a pair of upright tubes 32. A single angled back support 42 is attached to the hinge connector 36 and extends to the closer upright, and attachment using the securement clamp 46. The two upright tubes 32 are connected to one another using a parallel coupler 52, such as Doughty Model T58115, sold by Desert Specialty, Las Vegas, Nev. (www.lasvegasrigging.com). Although not shown in the drawings, the two drape lines are completed by attachment of a crossbar to the top of each of the upright tubes. Drapery is then secured to the first and second crossbars. Where adjustable-height uprights are used, after fastening the drapery, the uprights are raised to their desired height.

Figures 7, 8:
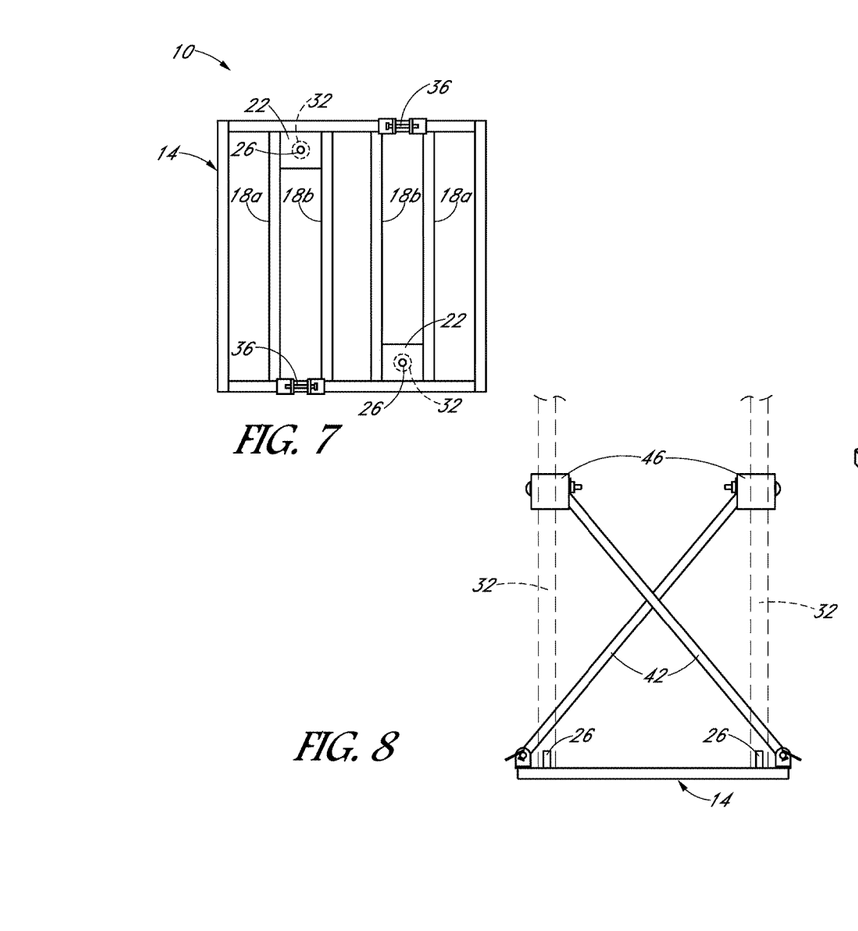
FIG. 7 is a top plan view, with portions in phantom, of a base plate of alternative design with offset, opposite upright support mounts and offset, spaced-apart angled back support hinge connectors in accordance with the present invention.
FIG. 8 is a partial side elevation view, with portions in phantom, showing a pair of angled back supports, each attached to the base plate and each attached to a separate one of the pair of offset, opposite-mounted upright supports in accordance with the present invention.
Figure 9:
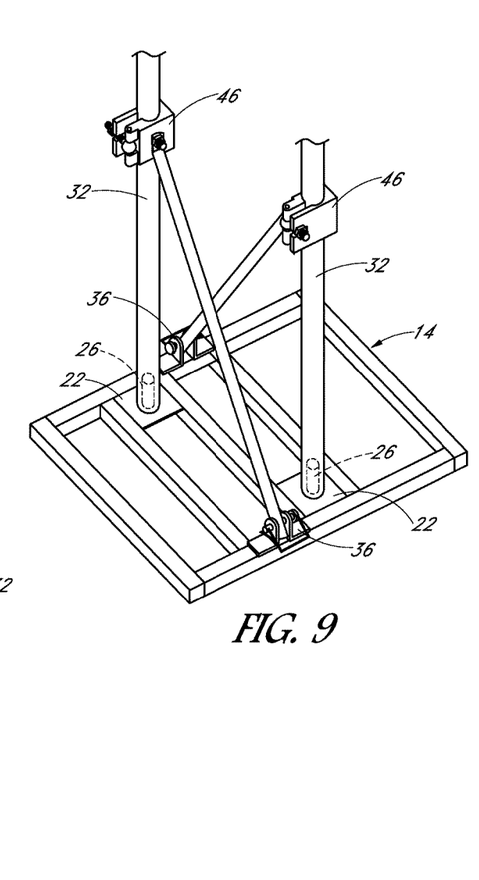
FIG. 9 is a partial perspective view, with portions in phantom, showing a pair of offset angled back supports, each attached to the base plate and each attached to a separate one of the pair of offset, opposite-mounted upright supports in accordance with the present invention.

Drapery is often used to divide event space, and FIGS. 7-9 illustrate the base plate 10 having a pair of the upright support plates 22 and a pair of hinge connectors 36 positioned within the outer frame 14 in a manner creating a double-sided divider—enabling the formation of two drape lines. Each side of the base plate has the upright support plate 22 adjacent to the hinge connector 36. A pair of central support braces 18 extend on either side of each of the paired support plates and hinge connectors.

Figures 10, 11, 12:
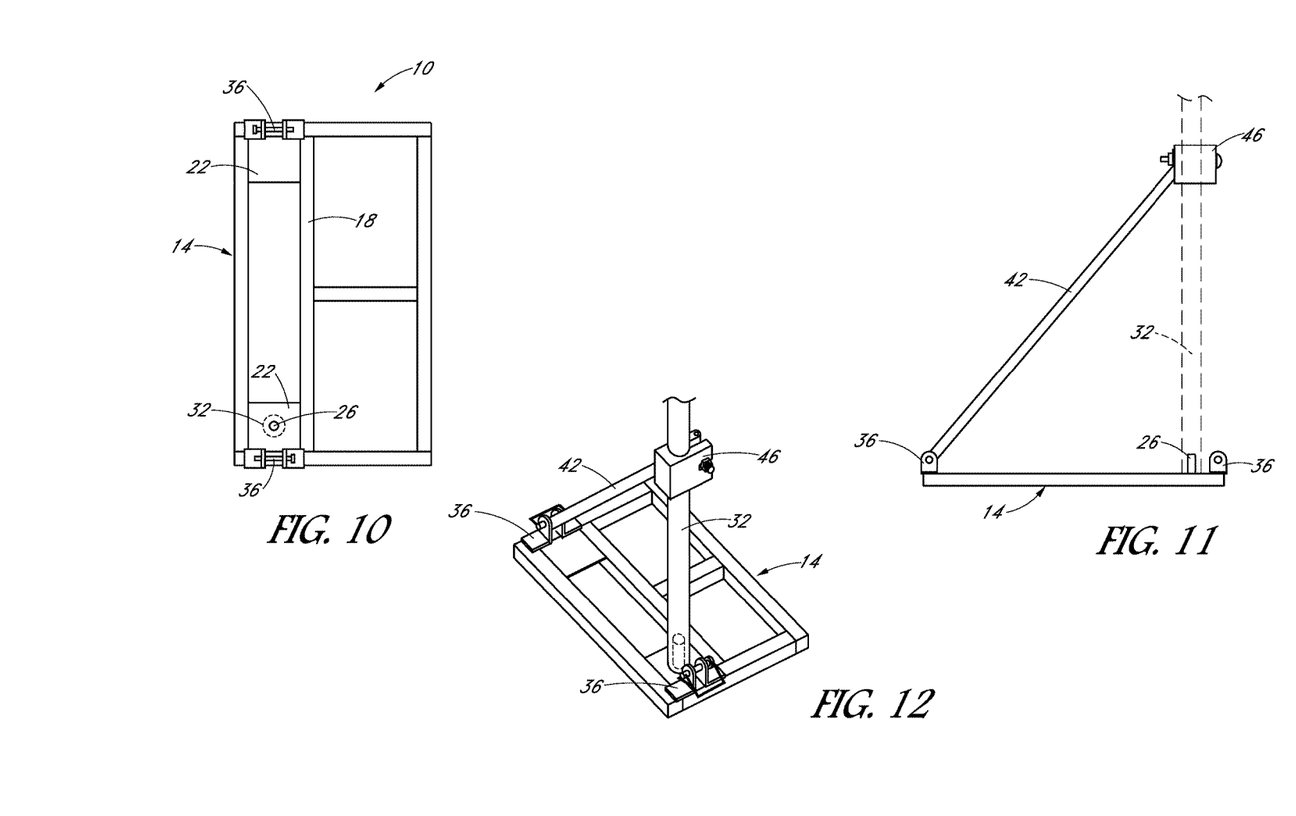
FIG. 10 is a top plan view, with portions in phantom, of a shortened base plate of alternative design with a pair of laterally positioned upright support mounts and aligned angled back support hinge connectors in accordance with the present invention.
FIG. 11 is a partial side elevation view, with portions in phantom, showing an angled back support attached to the shortened base plate and extending to attachment with an aligned, opposite-mounted upright support in accordance with the present invention.
FIG. 12 is a partial perspective view, with portions in phantom, showing an upright support with an aligned angled back support, each attached to the base plate along a lateral side thereof in accordance with the present invention.

The two upright support plates and the two hinge connectors are positioned on the outer frame in a manner adapted to cooperatively position and support a pair of offset angled back supports and a pair of offset and opposite-mounted upright tubes. FIG. 9 shows upon assembly, the angled back supports 42 on each side of the base plate attach to the upright tubes 32 extending from the upright support plates 22 on opposite sides of the base plate, the angled back supports crossing the base plate.

Where drapery is used to frame the entrance of an event space, extending inward from the sides of the door opening, FIGS. 10-12 illustrate the modified base plate 10, with a pair of adjacently positioned hinge connectors 36 and upright support plates 22 located opposite one another on a shortened outer frame 14. The extending portion of the base plate faces away from the door opening (minimizing the tripping hazard) and a single angled back support 42 attaches to the hinge connector 36 opposite the extending upright tube 32. Upon completion, a crossbar with attached drapery is supported by the end of the upright tube (drapery and crossbar not shown).

Using the standard configuration of the upright and base support shown in FIGS. 1-3, a presently preferred manner of assembly and a manner of its use to support a drape line is provided by way of example and not limitation. The base plate has an outer frame of 32 inches square fabricated out of 1-inch square steel tube of 0.095-inch wall thickness. The upright support plate or mount is rectangular measuring 4½ inches by 4 inches by ¼-inch thick. A central steel pin of diameter 2 inches projects from the upper surface and extends to a height of 16 inches.

The hinge mount/connector is an L-Bracket hinge formed using two L-shaped ⅛-inch steel plates measuring 2 inches in height and 1-inch in width and are welded to the steel tube frame spaced apart approximately 1 1/16 inches. A steel locking pin of 3/8-inch diameter and 2 1/2 inches long is received within 3/8-inch diameter apertures formed in the two upwardly-projecting "L" members.

Figure 13:
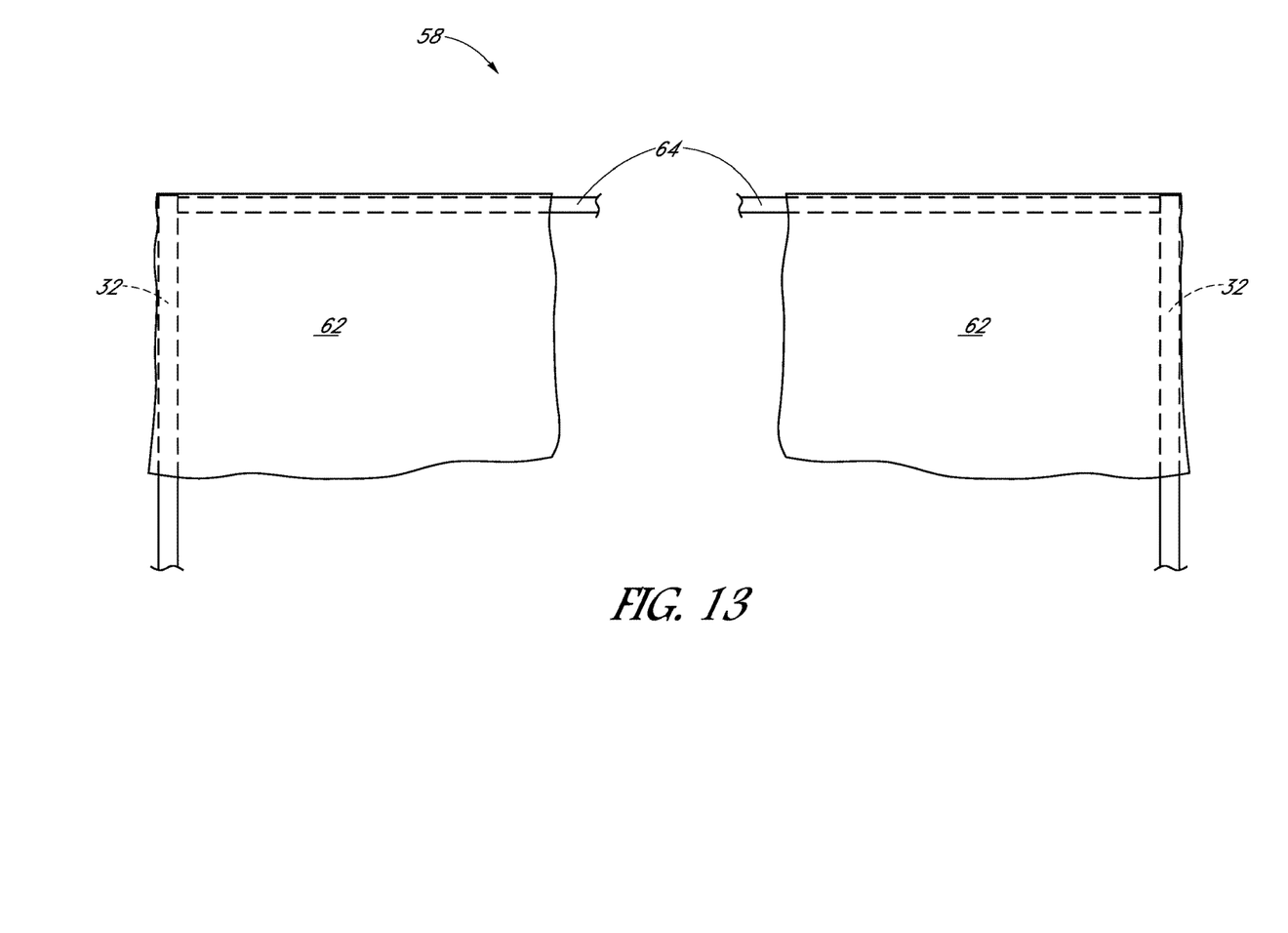
FIG. 13 is a partial side elevation view, with portions shown in phantom, showing a drapery line of the type supported in accordance with the present invention.

A ten-foot drape line 58 is shown in FIG. 13. A length of drapery 62 is supported by a drapery support crossbar 64 that extends between the tops of two upright tubes 32. Each of the upright tubes 32 extends from a base plate (not shown) constructed in one of the manners described. In a conventional drapery line, the two framed base plates are positioned ten feet apart, and weighted bags, typically sandbags, (not shown) are placed on top of the two center support braces of each base plate.

An upright tube extends from each of the base plates. The upright is preferably a round steel tube of 2 inches in diameter, a wall thickness of 1/16 inch, with an adjustable height of between 13 and 24 feet. An extending angled back support of ten feet attaches to the upright, preferably using a securement clamp known as a "Cheeseborough" or swivel clamp—a suitable half-coupler clamp for a 2-inch pipe is a Doughty Clamp, part number T58105, sold by Desert Specialty. The angled back support preferably consists of a round steel tube of 1-inch outer diameter and a thickness of 0.065 inch.

The uprights are inserted into the central pins on the base plates, and the angled back supports are attached to the L-Bracket hinge and secured to the upright tube using the Cheeseborough clamp. Once secured, the crossbar is placed across the two uprights, and the drapery is secured to the crossbar. For event space having higher ceilings, the uprights include a slip-lock collar assembly enabling their height extension. For such uprights, once the drapery is attached to the crossbar, the uprights are raised to the desired height.

On strike or teardown, the uprights are lowered to their minimum height, typically thirteen feet, and the drapery and the crossbar are removed from the ends of the uprights. The angled back support is removed from the Cheeseborough clamp, and both the angled back support and the uprights are removed from the base plates.

As various changes could be made in the above constructions without departing from the scope of the invention, it is intended that all the matter contained in the above description or shown in the accompanying drawings shall be interpreted as illustrative and not in a limiting sense.

What is claimed is:

1. Upright and base plate supports for event drapery, the base plate comprising:
    an outer frame, wherein the outer frame defines a geometric shape having opposed sides, and wherein the outer frame is rectangular;
    at least one central support brace attached to and extending between the opposed sides;
    an upright support plate attached to a lateral edge of the at least one central support brace and attached to one of the opposed sides of the outer frame, wherein the upright support plate has a central pin attached to an upper surface of the upright support plate and projects therefrom in a manner adapted to receive an upright tube; and
    a hinge connector attached to the outer frame and adapted to receive an angled back support, the hinge connector at a location on the outer frame adapted to cooperatively position and support the angled back support relative to the upright tube when received and extending from the support plate.

2. The upright and base plate supports for event drapery of claim 1, wherein the at least one central support brace comprises a pair of central support braces, the pair of central support braces are attached to and extend between opposed sides of the outer frame, and wherein the pair of central support braces extend in parallel relation between opposed sides of the outer frame, and wherein the upright support plate is disposed between and is attached to a lateral edge of each of the pair of support braces.

3. The upright and base plate supports for event drapery of claim 2, wherein the hinge connector is disposed between the pair of central support braces and is attached to the outer frame opposite that of the upright support plate.

4. The upright and base plate supports for event drapery of claim 3, wherein the upright support plate comprises a first upright support plate, and wherein a second upright support plate is provided, the first upright support plate attached to one of the opposed sides of the outer frame and the second upright support plate attached to the first upright support plate along a lateral edge opposite the attachment of the first upright support plate to the outer frame, and wherein each upright support plate has the central pin attached to an upper surface and projects therefrom in a manner adapted to receive an upright tube.

5. The upright and base plate supports for event drapery of claim 1, wherein the at least one central support brace comprises a first pair of central support braces and a second pair of central support braces, the two pairs of central support braces, all in parallel relation, are attached to and extend between opposed sides of the outer frame, and wherein the upright support plate comprises a first upright support plate and wherein a second upright support plate is provided, each upright support plate disposed between and attached to lateral edges of a separate one of the two pairs of central support braces and each attached to a separate one of the opposed sides of the outer frame, and wherein the hinge connector comprises a first hinge connector and wherein a second hinge connector is provided, each hinge connector disposed between a separate one of the two pairs of central support braces and each hinge connector attached to an opposed side of the outer frame opposite that of the upright support plate.

6. The upright and base plate supports for event drapery of claim 5, wherein each upright support plate has a central pin attached to an upper surface and projects therefrom in a manner adapted to receive the upright tube, and wherein each hinge connector is adapted to cooperatively position and support the angled back support relative to the upright tube when receiving and extending from the support plate, and wherein the two pairs of central support braces, the two upright support plates, and the two hinge connectors are positioned on the outer frame in a manner adapted to cooperatively position and support in an offset manner two of the angled back supports and in an offset and opposite-mounted manner two of the upright tubes.

7. The upright and base plate supports for event drapery of claim 1, wherein the upright support plate comprises a first upright support plate, and wherein a second upright support plate is provided, the first and the second upright support plates are each attached to a separate one of the opposed sides of the outer frame, and wherein the hinge connector comprises a first hinge connector and wherein a second hinge connector is provided, each hinge connector attached to the outer frame adjacent a separate one of the first and the second upright support plates.

8. Upright and base plate supports adapted for support of event drapery, comprising:

a base plate comprising:
  an outer frame, the outer frame of geometric shape defining a pair of opposing sides, wherein the outer frame is rectangular,
  at least one support brace attached to the outer frame and extending between the pair of opposing sides,
  an upright support plate attached to a side of the outer frame and to a lateral side of the at least one support brace, and
  a hinge connector attached to a side of the outer frame;
an upright tube received by the upright support plate and vertically extending therefrom, wherein an end of the upright tube is adapted to receive and support a drapery line, and wherein a central pin is attached to and extends from an upper surface of the upright support plate, the central pin is configured to slidably receive an end of the upright tube; and
an angled back support having a first end and a second end, wherein the first end is attached to the hinge connector and the second end is attached to the upright tube at an elevated location thereon.

9. The upright and base plate supports of claim 8, wherein a securement clamp attaches the second end of the angled back support to the upright tube.

10. The upright and base plate supports of claim 9, wherein the at least one support brace comprises a pair of support braces, each of the pair of support braces attached to the outer frame, the pair of support braces extending in parallel relation between the pair of opposing sides, and wherein the upright support plate is positioned between the pair of support braces and is attached to a lateral side of each, and the hinge connector is attached to the side of the outer frame located opposite the side of the outer frame attached to the upright support plate.

11. The upright and base plate supports of claim 10, wherein the upright support plate comprises a first upright support plate, and wherein a second upright support plate is provided, the first upright support plate attached to a side of the outer frame and to the lateral sides of each of the two support braces and the second upright support plate attached to a lateral side of the first upright support plate, and wherein a second central pin is provided, the second central pin is attached to and extends from an upper surface of the second upright support plate, the second central pin configured to slidably receive an end of the upright tube, and wherein a pair of upright tubes are provided, each of the pair of upright tubes received by a separate one of the central pins extending from a separate one of the first and the second upright support plates and further comprising a parallel coupler connecting the pair of upright tubes, wherein the securement clamp attaches the angled back support to one of the two upright tubes.

12. The upright and base plate supports of claim 9, wherein the at least one support brace comprises a first pair of support braces and a second pair of support braces, the first pair of support braces and the second pair of support braces are each in parallel relation and are each attached to and extend between opposing sides of the outer frame, and wherein the upright support plate comprises a first upright support plate, and wherein a second upright support plate is provided, and wherein a second central pin is provided, the second central pin is attached to and extends from an upper surface of the second upright support plate, each upright support plate disposed between and attached to lateral edges of a separate one of the two pairs of support braces and each upright support plate attached to a separate one of the pair of opposing sides of the outer frame, and wherein the hinge connector comprises a first hinge connector and wherein a second hinge connector is provided, each hinge connector disposed between a separate one of the two pairs of support braces and each hinge connector attached to an opposing side of the outer frame opposite that of the support plate, and wherein a pair of upright tubes are provided, each received by the central pin extending from a separate one of the two upright support plates, and wherein a pair of the angled back supports are provided, each of the pair of the angled back supports attached to a separate one of the two hinge connectors and a separate one of the two upright tubes, the upright tubes and the pair of the angled back supports cooperatively positioned to provide a pair of offset and opposite-mounted upright tubes with attached angled back supports adapted to support offset drapery lines.

* * * * *